United States Patent
Hu

(12) 
(10) Patent No.: US 6,170,043 B1
(45) Date of Patent: Jan. 2, 2001

(54) METHOD FOR CONTROLLING AN OPTIC DISK

(75) Inventor: Yi-Kwang Hu, Hsinchu (TW)

(73) Assignee: Media Tek Inc., Hsinchu (TW)

( * ) Notice: Under 35 U.S.C. 154(b), the term of this patent shall be extended for 0 days.

(21) Appl. No.: 09/234,977

(22) Filed: Jan. 22, 1999

(51) Int. Cl.$^7$ .................................................. G06F 12/00
(52) U.S. Cl. ......................... 711/158; 711/102; 711/111; 711/170
(58) Field of Search .................................. 711/158, 102, 711/111, 170, 112; 710/1, 52, 74

(56) References Cited

U.S. PATENT DOCUMENTS

| | | | |
|---|---|---|---|
| 5,884,093 | * | 3/1999 | Berenguel et al. ...................... 710/1 |
| 6,061,751 | * | 5/2000 | Bruner et al. ........................... 710/74 |
| 6,085,297 | * | 7/2000 | Satoh .................... 711/158 |
| 6,088,742 | * | 7/2000 | Sim ....................... 710/52 |
| 6,105,107 | * | 8/2000 | Ho et al. ............... 711/112 |

* cited by examiner

Primary Examiner—John W. Cabeca
Assistant Examiner—Fred F. Tzeng
(74) Attorney, Agent, or Firm—J.C. Patents; Jiawei Huang

(57) ABSTRACT

A CD-ROM control chip is provided for a use of firmware information update in the CD-ROM system. The control chip at least includes a microprocessor, a decoder, a controller, and an extra memory. The microprocessor is coupled to a data bus, and further coupled to an external ROM, which stores all firmware information. The decoder is coupled to the microprocessor through the data bus, and is also coupled to an external buffer memory and an external main board interface. The external main board interface allows the CD-ROM control chip to communicate with an external computer. The controller is coupled to the decoder, and is coupled to the microprocessor the data bus. The controller is used to receive information and control signals from an external CD. The extra memory is coupled to the microprocessor through the data bus. When the microprocessor starts to update the firmware information, it generates at least one output enabling signal, one chip selecting signal, and one writing-in signal, and sends these signals to the external ROM. The external ROM is treated as an information storing space, and the extra memory is treated as execution space used by an update program routine.

22 Claims, 6 Drawing Sheets

METHOD FOR CONTROLLING AN OPTIC DISK

CROSS-REFERENCE TO RELATED APPLICATION

This application claims the priority benefit of Taiwan application Ser. No. 87118506, filed Nov. 6, 1998, the full disclosure of which is incorporated herein by reference.

BACKGROUND OF THE INVENTION

1. Field of the Invention

This invention relates to an optic disk, and more particularly to a control method used to control an optic disk system.

2. Description of Related Art

FIG. 1 is a schematic drawing of an optic disk system of a conventional compactdisk (CD) read-only-memory (ROM), or called CD-ROM. In FIG. 1, a CD 100 includes a large amount of data, which are to read by an optic pickup head 102. When data are processed by a radio-frequency (RF) amplifier and controller 110, the processed data are decoded by a decoder 114. The decoded data are stored in a buffer memory 116. A microprocessor 112 is used to control the RF amplifier and controller 110, the decoder 114, the optic pickup head, and a driving force to drive the optic disk 100 to obtain a proper performance. In other words, the microprocessor 112 controls all operations of an optic disk system, such as a CD-ROM system. The microprocessor 112 is also coupled to a ROM 118, which stores all needed data, commands, instructions, programs, and all other information used in the optic disk system, all of which are generally called firmware information. Users can read the data stored in the buffer memory 116 through a computer 122, a main board interface 120, and the decoder 114.

Recently, computer industry has been rapidly developed. Its various periphery hardware devices are also accordingly developed. The CD-ROM is an essential periphery device of the computer, so that the CD-ROM needs a method to be able to rapidly update the firmware information. A conventional method to update the firmware usually puts all firmware data and the execution program for update in a single ROM. This manner consumes the available memory space of the ROM and further causes a longer execution time of the update process.

SUMMARY OF THE INVENTION

It is therefore an objective of the present invention to provide a CD-ROM control chip, which provides an extra memory space. When the an update execution program is executed to update a firmware information, the update execution program does not occupy memory space of a ROM, and further has faster execution speed so that the firmware information can be updated in a shorter time.

It is another an objective of the present invention to provide a method for updating a firmware information so as to reduce an updating time.

In accordance with the foregoing and other objectives of the present invention, a CD-ROM control chip is provided for a use of firmware information update. The CD-ROM control chip at least includes a microprocessor, a decoder, a controller, and an extra memory. The microprocessor is coupled to a data bus, and further coupled to an external ROM, which stores all firmware information. The decoder is coupled to the microprocessor through the data bus, and is also coupled to an external buffer memory and an external main board interface. The external main board interface allows the CD-ROM control chip to communicate with an external computer. The controller is coupled to the decoder, and is coupled to the microprocessor the data bus. The controller is used to receive information and control signals from an external CD. The extra memory is coupled to the microprocessor through the data bus. When the microprocessor starts to update the firmware information, it generates at least one output enabling signal, one chip selecting signal, and one writing-in signal, and sends these signals to the external ROM. The external ROM is treated as an information storing space, and the extra memory is treated as execution space used by an update program routine. In the above descriptions, the buffer memory can be, for example, an usual dynamic random access memory (DRAM), and the external ROM can be, for example, a flash ROM or an electric erasable programmable ROM (EEPROM).

In accordance with the foregoing CD-ROM chip and other objectives of the present invention, a method to address the extra memory is provided. In this method, when firmware information is updated, the firmware information and execution commands are divided into several parts. Each part is stored in a different memory area. For example, the firmware information is written into the ROM through the buffer memory, and the execution commands are stored in the extra memory. Therefore, the firmware information and the execution commands have their own individual memories. The firmware information can be updated in a faster speed.

Moreover, in the invention, a refresh queue unit is also introduced. The refresh queue provides a larger refreshing buffer capability so that a refreshing sequence is not delayed during the memories are busy in update actions.

BRIEF DESCRIPTION OF DRAWINGS

The invention can be more fully understood by reading the following detailed description of the preferred embodiment, with reference made to the accompanying drawings as follows.

DETAILED DESCRIPTION OF PREFERRED EMBODIMENT

As mention in the previous descriptions, CD-ROM apparatus is an essential periphery apparatus in computer industry. In order to obtain a faster performance to match the main computer performance, the CD-ROM needs a faster updating method to update firmware information. In the invention, a more efficient updating method is introduced to be able to update firmware of CD-ROM system in a faster speed. The purpose of the invention is achieved by also including a CD-ROM chip. The method is also very suitable for any current CD-ROM system so that the method of the invention can be easily applied.

Figure 1:
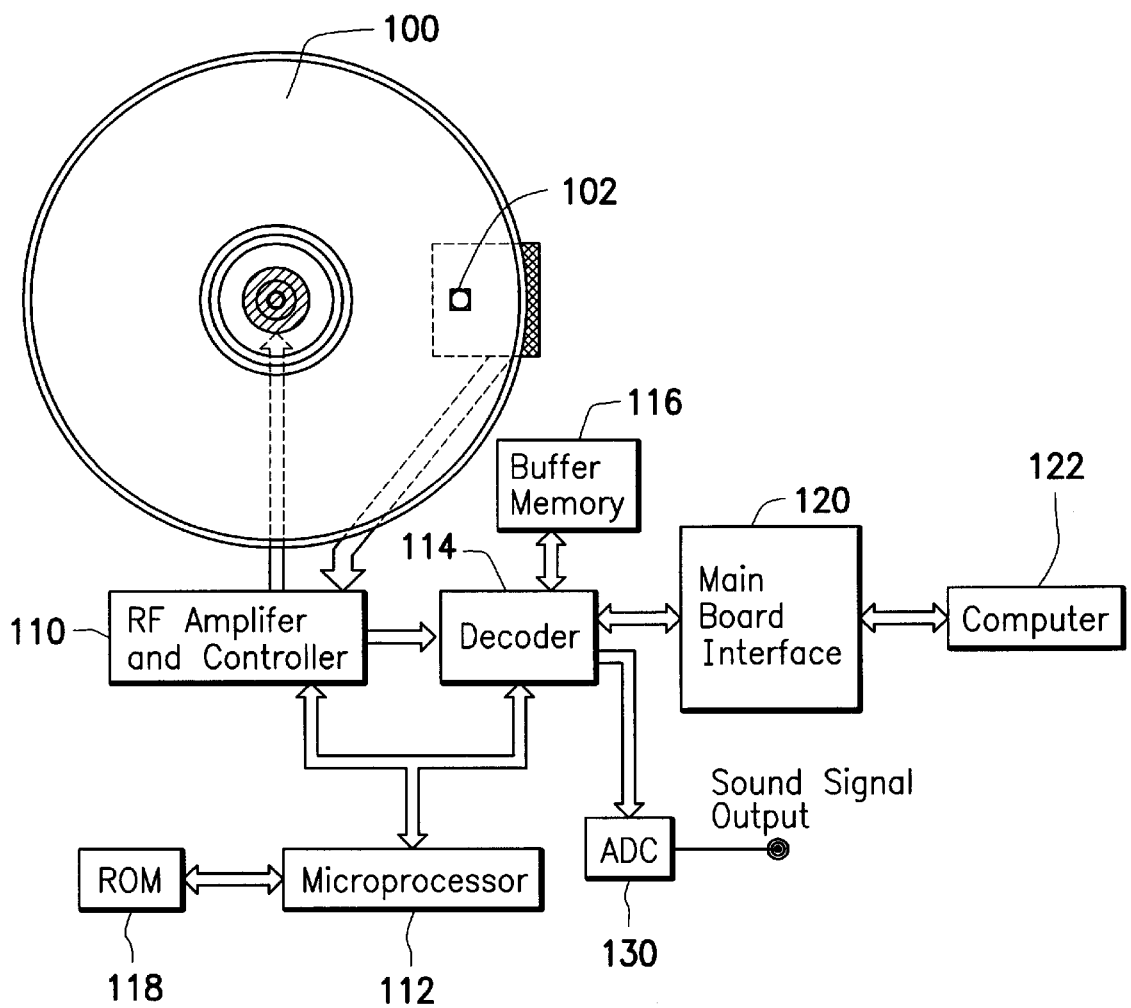
FIG. 1 is schematic drawing of a conventional CD-ROM system.
Figure 2:
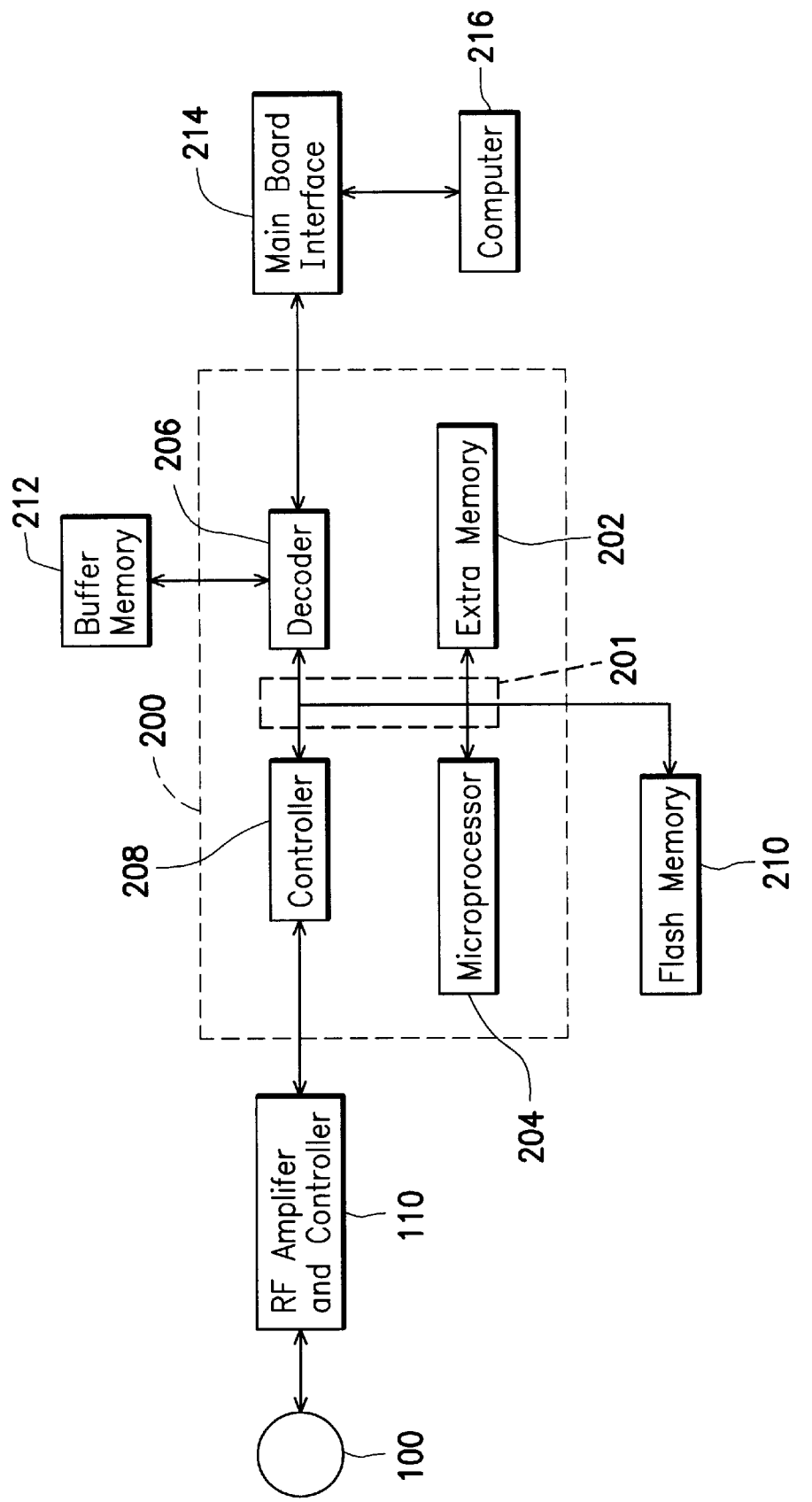
FIG. 2 is a block diagram, schematically illustrating a CD-ROM system including a system control chip and its periphery units, according to a preferred embodiment of the invention.

FIG. 2 is a block diagram, schematically illustrating a CD-ROM system including a system control chip and its periphery units, according to a preferred embodiment of the invention. In FIG. 2, a CD-ROM system control chip 200 is used to update firmware information, which is stored in a memory 210, such as a flash memory 210 or an electrical erasable programmable ROM (EEPROM). The system control chip 200 includes an extra memory 202, such as a dynamic random access memory (DRAM), a microprocessor 204, a decoder 206, and a controller 208. A data bus 201 used for various couplings can be either included in the system control chip 200 or stay externally. The extra memory 202 is the introduced part of the invention. The microprocessor 204 is separately coupled to the extra memory 202, the decoder 206, the controller 208, and the flash memory 210 so as to directly control the controller 208 and the decoder 206, and directly access the flash memory 210 and the extra memory 202. The decoder 206 and the controller are also coupled together. The controller 208 is used to receive an external inputs of control signals and information, such as control signals from the radio-frequency (RF) amplifier and controller 110 and information stored in a compact disk (CD) 100 through the RF amplifier and controller 110. The decoder is coupled to a buffer memory 212 external to the system control chip 200. The buffer memory 212 preferably is a DRAM and can communicate with a computer 216 through a main board interface 214. The main board interface 214 can be an IDE interface, an enhanced-IDE, or a SCSI interface.

When the CD-ROM system is operated at a normal mode, at which there is no need to update firmware information, the microprocessor 204 reads information stored in the flash memory 210 through a data bus 201, which is only schematically illustrated in the figure. The data bus 201 provides the necessary couplings between each units. At this normal mode, the flash memory 210 is used as a memory space for a system program to store all execution instructions. The extra memory 202 is used as a memory space to store general information, such as information from the CD 100.

Figure 3A:
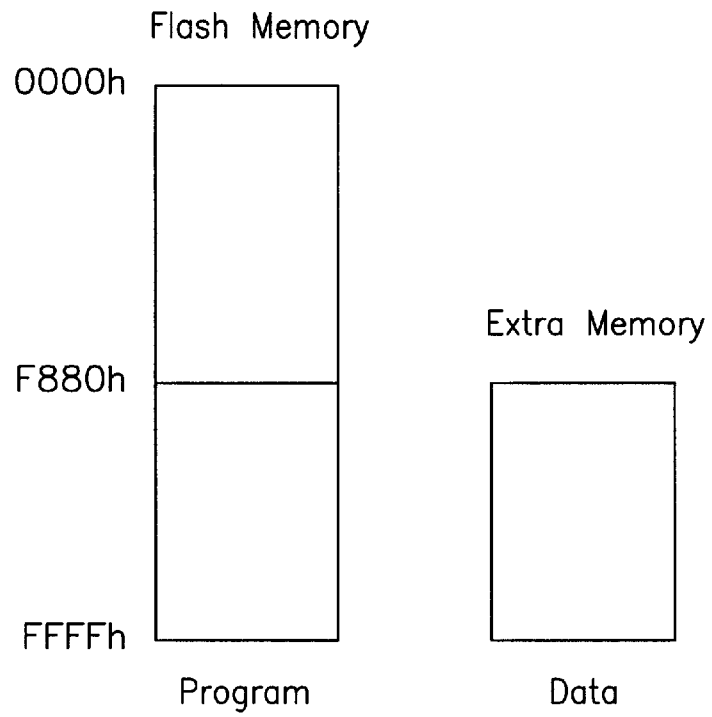
FIG. 3A is a memory address location diagram, schematically illustrating a memory address location when the CD-ROM system is normally operated, according to the preferred embodiment of the invention.

In general, when the computer 216 is turned on or reset, the microprocessor 204 first initializes the optic disk system, such as the CD-ROM system, and stays at queue status to receive a command from the computer 216 so as to start to read information from the CD 100. When the computer 216 sends the command to request a read, the microprocessor 204 then sends desired parameters out to control the controller 208 and the decoder 206 so as to drive a motor and an optic head (not shown) to read information of the CD 100. The information of the CD 100 is decoded and corrected, if it is necessary, by the decoder 206 and then is stored in the buffer memory 212. The computer 216 can therefore read the information stored in the buffer memory 212 through the main board interface 214 and the decoder 206. At this stage, the extra memory 202 used to store general information, and the flash memory 210 is used to store system program, as shown in FIG. 3A.

In an update programming mode, the CD-ROM system needs to update firmware information. An update program can be installed into the CD-ROM system through either reading the CD 100 or executing a special installation software, which has been downloaded in the computer 216. The update program includes a program code, and an update program routine. The program code is treated as data that are to be updated. The update program, usually, is stored a special format, such as a table of content (TOC) format. At this update mode, the extra memory 202 is used to store the update program routine, and the program code data are first stored in the buffer memory 212.

Figure 4:
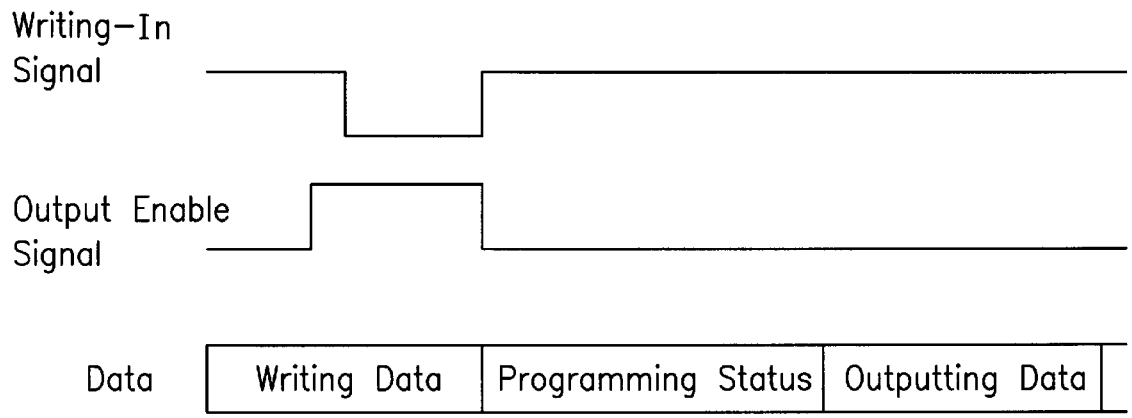
FIG. 4 is a time sequence drawing, schematically illustrating a time relation between a data structure of a flash memory and a control signal, according to the preferred embodiment of the invention.

The micro processor 204 reads instructions, which reside in the update program routine, from the extra memory 202 and executes the instructions. The program code data stored in the buffer memory 212 are sequentially written into the flash memory 210, which serves as a memory space for the program code data. Here, the program code is treated as data that is the firmware information to be updated. The original program code data stored in the flash memory 212 are compared with the program code data from the buffer memory 202, and are updated. When the program code data are written in, the flash memory 210 sends an indicator flag to the dada bus 201 to indicate the status of the flash memory 210. The microprocessor 204 can obtain the indicator flag to know whether the update program routine is executing or has finished. For example, FIG. 4 is a time sequence drawing, schematically illustrating a time relation between a data structure of a flash memory and a control signal, according to the preferred embodiment of the invention. In FIG. 4, when an output enable (OE) signal is at high level and an writing-in (WR) signal turns to a low level, the update data are written into the flash memory 210. When the flash memory 210 finishes writing-in data, the WR signal goes to high level. The flash memory 210 also exports a programming status of program code.

Generally, there are at least two ways to program a flash memory. One way is byte by byte, and another way is page by page. One page usually includes 128 bytes.

If the programming status of the flash memory 210 indicates it is at updating status, the microprocessor 204 then stays at queue status until a next byte or a next page is written in. This updating process described above is executed until all program code data stored in the buffer memory 212 is written into the flash memory 210. The updating process of the firmware information then finishes.

Figure 3B:
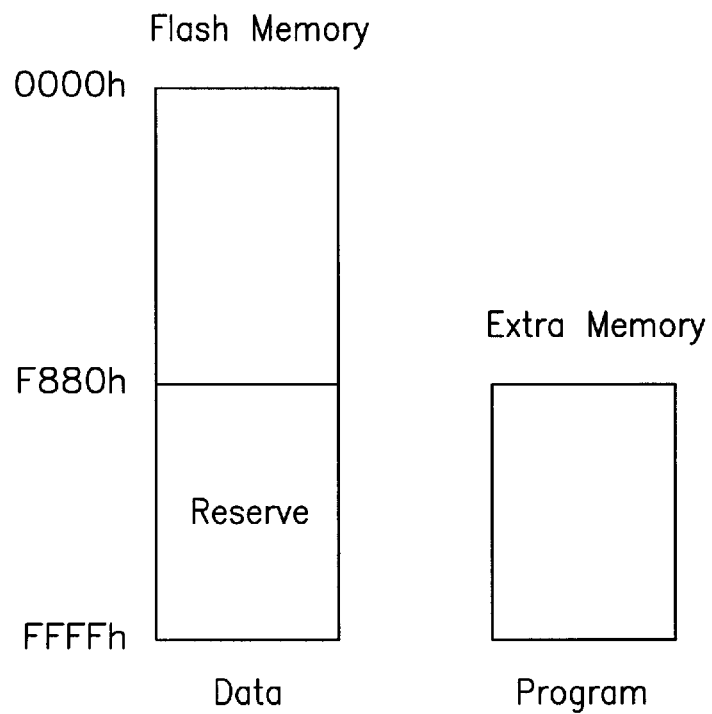
FIG. 3B is a memory address location diagram, schematically illustrating a memory address location when the CD-ROM system is normally operated, according to the preferred embodiment of the invention.

During writing-in the program code data to program the flash memory 210, some memory units to store address are reserved. For example, FIG. 3B is a memory address location diagram, schematically illustrating a memory address location when the CD-ROM system is normally operated, according to the preferred embodiment of the invention. In FIG. 3B, the memory units belonging to an address range of, for example, F880h–FFFFh are not read or written so as to prevent an incomplete programming of the flash memory 210 from occurring due to any reason.

Figure 5:
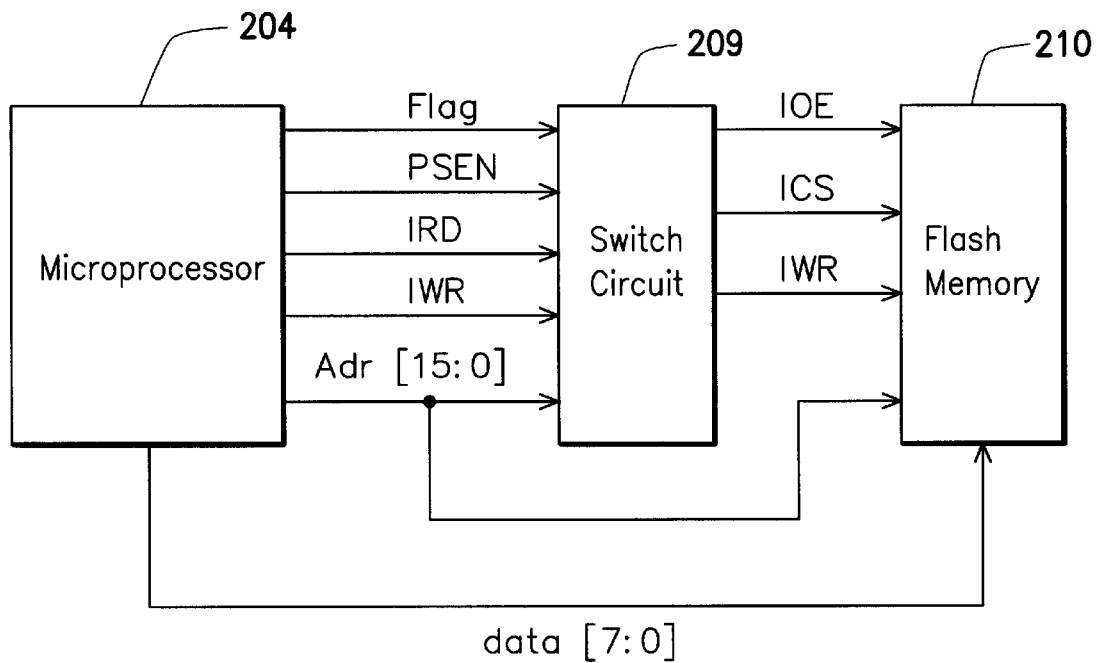
FIG. 5 is a structure diagram of control signal, schematically illustrating a control relation between the microprocessor and the flash memory, according to the preferred embodiment of the invention.

FIG. 5 is a structure diagram of control signal, schematically illustrating a control relation between the microprocessor and the flash memory, according to the preferred embodiment of the invention. In FIG. 5, after the program code data are downloaded into the buffer memory 212 and the update program routine is downloaded into the extra memory 202, the microprocessor 204 will jump to a special address, such as the F880h of FIG. 3B, which is determined by the extra memory 202. The special address is used to update the program code of the flash memory 210. The microprocessor 204 produces an indicator flag to a switch circuit 209 so as to switch the CD-ROM system to the update programming mode. The flash memory 210 is switched to a status serve as a memory space of the program code dada, and the microprocessor 204 also read instructions of an instruction stack, which is stored in the extra memory 202, from the highest-address. The data stored in the buffer memory 210 are access through the decoder 206. The switch circuit 209 controlled by the microprocessor 204 produces control signals, such as a chip select (CS) signal, a writing-in (WR) signal, and an output enable (OE) signal, to control the flash memory 210.

Figure 6:
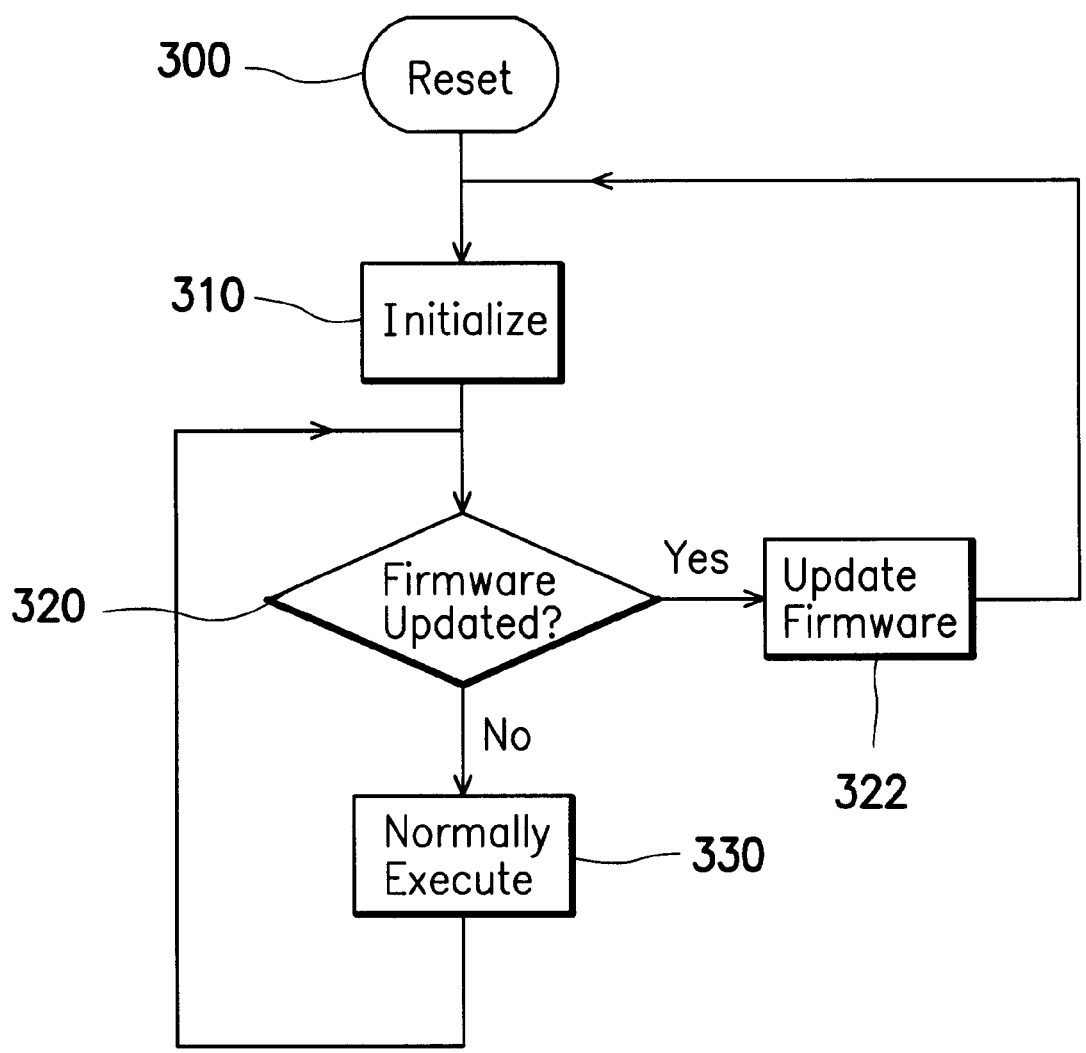
FIG. 6 is a diagnosis flow diagram, schematically illustrating a procedure to monitor a status of the firmware update, according to the preferred embodiment of the invention.
Figure 7:
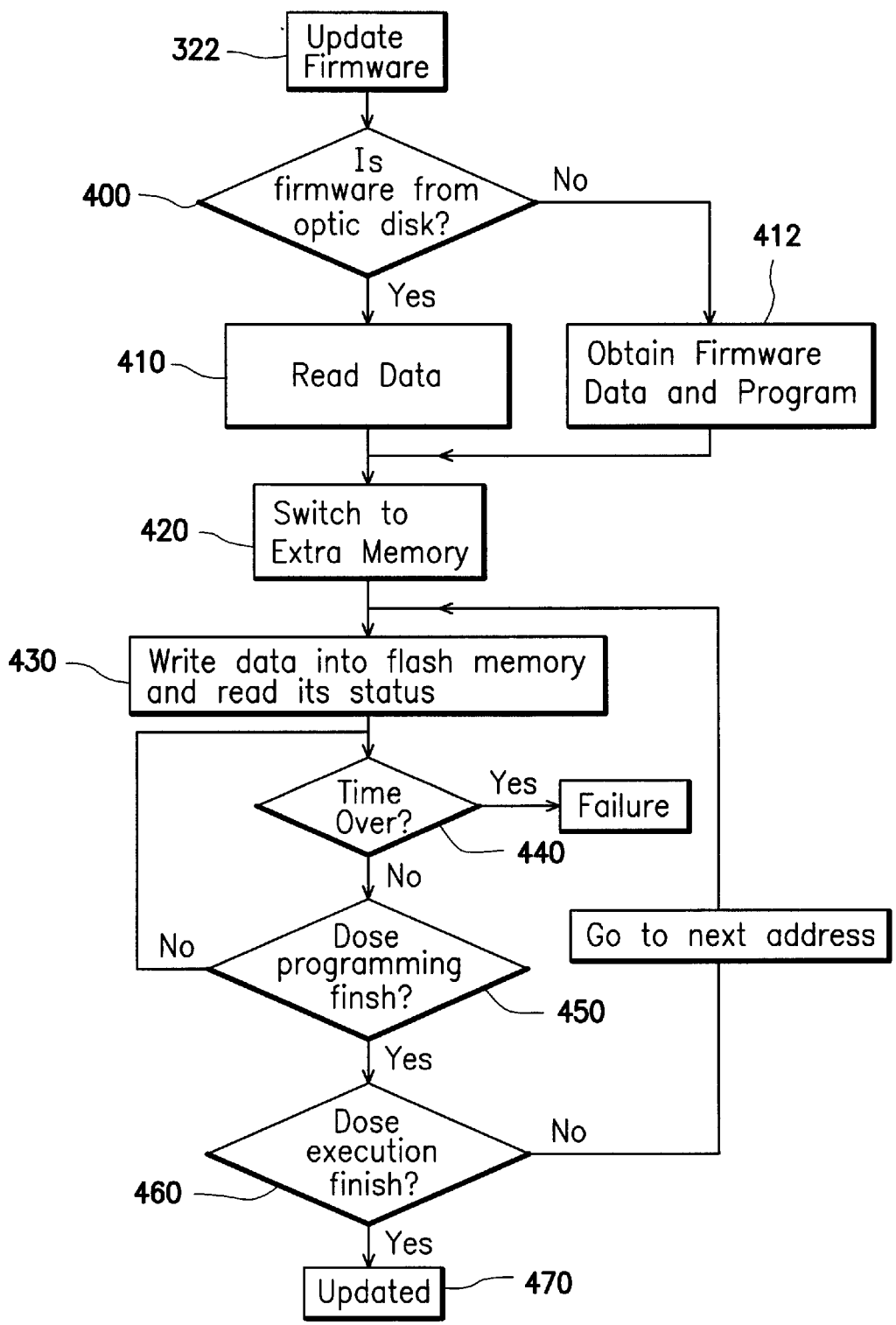
FIG. 7 is execution flow diagram, schematically illustrating how the firmware information is updated, according to the preferred embodiment of the invention.

FIG. 6 is a diagnosis flow diagram, schematically illustrating a procedure to monitor a status of the firmware update, according to the preferred embodiment of the invention. FIG. 7 is execution flow diagram, schematically illustrating how the firmware information is updated, according to the preferred embodiment of the invention.

In FIG. 2 and FIG. 6, at step 300, the computer 216 is reset. At step 310, the computer 216 instructs the microprocessor 204 to initialize the CD-ROM system. At step 320, the microprocessor 204 makes a judgment to determine whether the firmware information is to be updated or not. If the firmware information is to be updated, then the system goes to step 322, in which the microprocessor 204 triggers the CD-ROM system to update the firmware information. If firmware information need not be updated, the system goes to step 330 for a normal operation, and goes back to step 320. The system uses the original firmware information including, for example, program code, function, and instructions stored in the flash memory 210 to operate the CD-ROM system.

When users or manufacturers ask the CD-ROM system to update its current firmware information, the step 322 is executed. The update firmware information may come from a CD 100 or the computer 216, in which the update firmware information has been downloaded in the computer 216 through the main board interface 214.

In FIG. 2 and FIG. 7, the system starts from the step 322. Then, the system goes to step 400 to determine where does the update firmware information come from. If an update firmware information source is from a CD, the system then perform a step 410 to read an update program., which includes a program code data and an update program routine and has a special format, such as a table of content (TOC). The program code data are stored in a first buffer memory, and the update program routine is stored in a second buffer memory. The first buffer memory includes a DRAM, such as the buffer memory 212, and the second buffer memory includes, for example, the flash memory 210 in FIG. 2 or an EEPROM.

If the update firmware information source is from the computer, the system goes to step 412 to wait for the computer to download the update program. Then update program has a special format. The program code data are stored in the first buffer memory, and the update program routine is stored in the second buffer memory.

At step 420, the microprocessor jumps to a special address at the second buffer memory. An original execution program memory space is treated as a data access memory space to store the program code data that are to be updated, and the second buffer memory is treated as an execution program memory space to store the update program routine.

At step 430, the update program routine stored in the second buffer memory is executed to program the data access memory space with the new program code data, in which the data access memory space is the flash memory of FIG. 2 that is the original execution program memory space. An indicator flag is also generated to tell the updating status.

At step 440, a time-over judgment is executed. If the used writing time is over a certain limit, it means a failure of update. Otherwise, the system goes to step 450, which is a judgement of whether the programming of the data access memory space finishes or not. If it is not, the system goes back to the step 440. If it finishes, the system goes to step 460 to determine whether all instructions of the update program routine have finished or not. If it is not yet, the system goes back to the step 430 to update another data block stored at a next address. If it is, the system goes to step 470, which means the update of the firmware information is finished.

When the update of the firmware information is finished, the system returns to the norm mode. The current data access memory space is switched back to serve as the normal execution program memory, that is, the flash memory 210, and the current execution program memory, that is, the second buffer memory is switched back to serve as the normal data access memory space, that is, the extra memory 202. Now the updated program code data are stored in the flash memory 210 and is to serve as the new firmware information, which includes, for example, an updated program to control the CD-ROM system and several updated data to provide new information to the CD-ROM.

In the above descriptions, if the system goes to the step 412 to obtain update program code from the computer. The update program code can be pre-downloaded into the computer through the main board interface 214 to fetch the desired update program code from a remote data source. The main board interface 214 includes, for example, an IDE interface, enhanced-IDE interface, or a SCSI interface, all of which are common products in the computer market. Once the desired update program is obtained, the system goes to the step 420 to continue the rest steps.

In conclusion, the invention has following characteristics. The extra memory 202 is introduced in the invention. When the optic disk system, such as the CD-ROM system, desires to update its firmware information, the extra memory 202 is temporarily treated as an execution program memory to execute all update actions. The flash memory 210 is temporarily treat as a data access memory space to store the updated firmware information. In this manner, the update process can be executed in a faster speed. When the firmware information is updated in the flash memory 210, the flash memory 210 returns to its original role to serve as the execution program memory. The extra memory serves a general data memory space. No matter in which working mode, the execution part and the data part are always separately so that operation speed is always kept in a higher efficiency. In the conventional system the ROM 118 is the only memory space, in which the ROM 118 is commonly occupied by the execution part and the data part, so that the operation speed is much slower.

The invention has been described using an exemplary preferred embodiment. However, it is to be understood that the scope of the invention is not limited to the disclosed embodiment. On the contrary, it is intended to cover various modifications and similar arrangements. The scope of the claims, therefore, should be accorded the broadest interpretation so as to encompass all such modifications and similar arrangements.

What is claimed is:

1. An optic-disk system control chip, used in an optic-disk system to update its firmware information, the control chip comprising:

a microprocessor, coupled to a data bus, wherein the microprocessor is also coupled to an external memory through the data bus, in which the external memory is used to store the firmware information;

a decoder, coupled to the microprocessor through the data bus, wherein the decoder is also coupled to an external buffer memory, and an external main board inter face, which serves as an interface to communicate with an external computer;

a controller, coupled to the decoder, and coupled to the microprocessor through the data bus, wherein the controller is used to receive a control signal and general data; and an extra memory, coupled to the microprocessor through the data bus, wherein when the optic-disk system is operated at an update mode, the microprocessor yields at least an output enable signal, a chip selection signal, and a writing-in signal so as to temporarily treat the external memory to as a data access memory and treat the extra memory as an execution program memory, and after the firmware is completely updated, the extra memory is treated back as its original data access memory and the external memory is treated back as its original execution program memory.

2. The control chip of claim 1, wherein the external memory comprises a flash memory.

3. The control chip of claim 1, wherein the external memory comprises an electrical erasable programmable read only memory (EEPROM).

4. The control chip of claim 1, wherein the extra memory comprises dynamic random access memory (DRAM).

5. The control chip of claim 1, wherein the external buffer memory coupled to the decoder comprises DRAM.

6. The control chip of claim 1, wherein the main board interface comprises an IDE interface.

7. The control chip of claim 1, wherein the main board interface comprises an enhanced-IDE interface.

8. The control chip of claim 1, wherein the optic-disk system comprises a CD-ROM system.

9. An update method used in an optic-disk system to update its firmware information, which is stored in a firmware memory, through a microprocessor, wherein the firmware memory serves as an intrinsic execution program memory, the method comprising:

fetching an update program with a characteristic format from a compact disk (CD), in which the update program includes a program code and an update program routine;

storing the program code into a first buffer memory, and the update program routine into a second buffer memory, wherein the microprocessor accesses to the second buffer memory at a special address, treats the firmware memory as a data access memory, and treats the second buffer memory as an execution program memory;

executing the update program routine stored in the second buffer memory;

writing the program code stored in the first buffer memory into the firmware memory to update the firmware information;

treating the firmware memory back as its intrinsic execution program memory, and treating the second buffer memory back as its intrinsic data access memory; and using the program code as an updated firmware information to control the opticdisk system and provide any kind of updated information residing in the program code.

10. The method of claim 9, wherein the optic-disk system comprises a CD-ROM system.

11. The method of claim 9, wherein the firmware memory comprises a flash memory.

12. The method of claim 9, wherein the firmware memory comprises an electrical erasable programmable read only memory (EEPROM).

13. The method of claim 9, wherein the first buffer memory comprises dynamic random access memory (DRAM).

14. The method of claim 9, wherein the second buffer memory comprises DRAM.

15. An update method used in an optic-disk system to update its firmware information, which is stored in a firmware memory, through a microprocessor, wherein the firmware memory serves as an intrinsic execution program memory, the method comprising:

fetching an update program from a peripheral device through a main board interface, in which the update program includes a program code and an update program routine;

storing the program code into a first buffer memory, and the update program routine into a second buffer memory, wherein the microprocessor accesses to the second buffer memory at a special address, treats the firmware memory as a data access memory, and treats the second buffer memory as an execution program memory;

executing the update program routine stored in the second buffer memory;

writing the program code stored in the first buffer memory into the firmware memory to update the firmware information;

treating the firmware memory back as its intrinsic execution program memory, and treating the second buffer memory back as its intrinsic data access memory; and using the program code as an updated firmware information to control the optic-disk system and provide any kind of updated information residing in the program code.

16. The method of claim 15, wherein the optic-disk system comprises a CD-ROM system.

17. The method of claim 15, wherein the firmware memory comprises a flash memory.

18. The method of claim 15, wherein the firmware memory comprises an electrical erasable programmable read only memory (EEPROM).

19. The method of claim 15, wherein the first buffer memory comprises dynamic random access memory (DRAM).

20. The method of claim 15, wherein the second buffer memory comprises DRAM.

21. The method of claim 15, wherein in the step of fetching the update program, the periphery device comprises a computer, which comprises the update program by downloading the update program from an software source.

22. The method of claim 15, wherein in the step of fetching the update program, the main board interface comprises an IDE interface, an enhanced-IDE interface, or a SCSI interface.

* * * * *